Donald A. McCabe
Marion J. Meyer
INVENTORS.

BY Murray Robinson

ATTORNEY

Donald A. McCabe
Marion J. Meyer
INVENTORS.

BY Murray Robinson

ATTORNEY

United States Patent Office 3,468,663
Patented Sept. 23, 1969

3,468,663
PHOTOGRAMMETRY
Marion J. Meyer and Donald A. McCabe, Albuquerque, N. Mex., assignors to Limbaugh Engineers, Inc., Albuquerque, N. Mex., a corporation of New Mexico
Filed Apr. 4, 1966, Ser. No. 539,929
Int. Cl. G03c *5/04;* G03f *5/00*
U.S. Cl. 96—41 3 Claims

ABSTRACT OF THE DISCLOSURE

Before and after negative transparencies of the same locale and of the same scale are superimposed and a laminate placed thereover. Optical comparison reveals the areas of change and the corresponding areas of the laminate are peeled, producing a temporary mask. Direct and reverse masks are prepared photographically from the temporary mask. A time contrast photograph is printed by double exposure, e.g. of the after negative, once through the reverse mask and once through the direct mask and a half-tone screen, whereby the unchanged areas appear in half-tone and the changed areas in full tone.

This invention pertains to photogrammetry.

The object of the invention is to produce a time contrast map in which changed areas are presented differently from unchanged areas so that the respective areas are made known from inspection of the one map. A further object of the invention is to produce a time contrast map quickly, accurately, and economically. Other objects and advantages of the invention will appear from the following description of a preferred embodiment thereof.

Briefly, according to the invention before and after aerial photo negatives are correlated as to area, conformed as to scale, and superimposed in register with each other. Two masks are prepared, one covering the changed area, the other covering the unchanged area. A single positive is made by exposing it through the after negative and the mask covering the unchanged area and by also exposing it through either of the before or after negatives, the mask covering the changed area, and a half-tone screen. The resultant positive is a time composite aerial photo map in which the unchanged area appears in half-tone and the changed area in full-tone.

For a more detailed description of the invention reference will now be made to the accompanying schematic drawings wherein.

Figures 1, 2, 3:
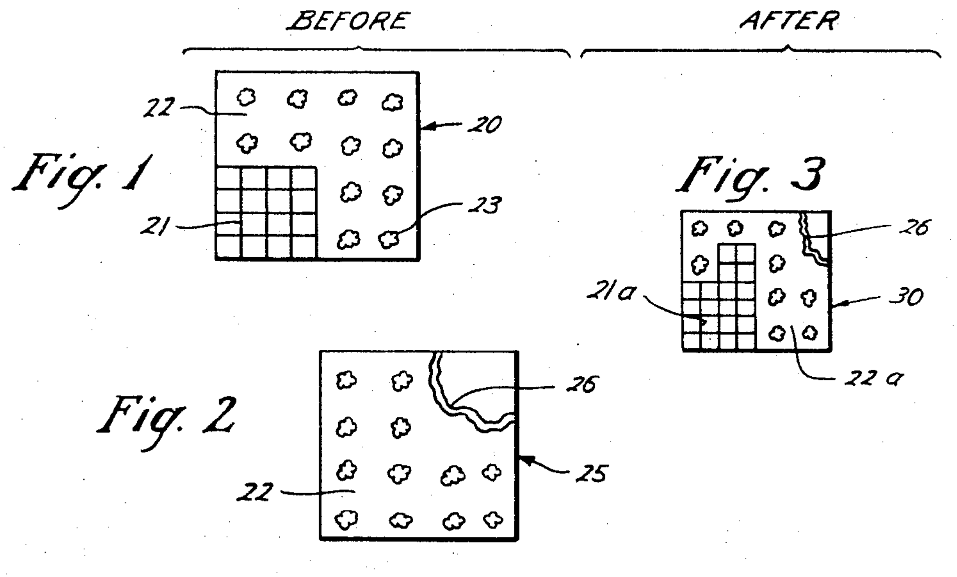
FIGURE 1 is a representation of an exposed transparent photosensitive film constituting a "before" aerial photo negative.
FIGURE 2 is another "before" aerial photo negative covering an area overlapping the area covered by the FIGURE 1 negative, e.g. as the result of successive aerial photographs taken in a single flight.
FIGURE 3 is a similar exposed transparent photosensitive film constituting an "after" aerial photo negative covering a portion of the area of FIGURES 1 and 2, and to a different scale, the difference in scale being exaggerated.

Referring now to FIGURE 1, there is shown an aerial photo negative 20 wherein a part of the area 21 is a city area with streets and the rest of the area 22 is wooded as represented by trees 23.

FIGURE 2 shows an aerial photo negative 25 adjacent and overlapping the area covered by negative 20. Negative 20 shows a continuation of the wooded area 22 and includes also a stream 26.

FIGURE 3 shows an aerial photo negative 30 covering a portion of the area covered by negatives 20 and 25, including the same stream 26. However, negative 30 was made at a later time than negatives 20 and 25, and the wooded area 22A has shrunk while the city area 21A has grown. Negative 30 was taken at a greater height than negatives 20 and 25 so that the scale of negative 30 is smaller.

Figure 4:
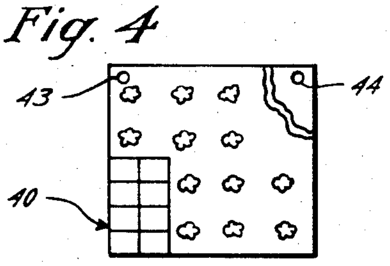
FIGURE 4 is a transparent photo negative produced from a mosaic of the FIGURES 1 and 2 negatives covering the same areas as the FIGURE 3 negative.
Figure 5:
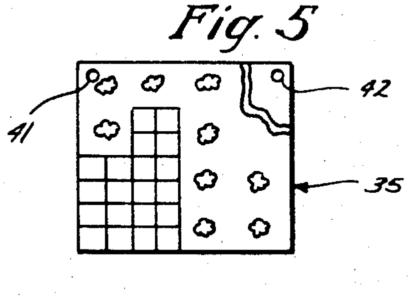
FIGURE 5 is a reproduction of the FIGURE 3 negative to the same scale as FIGURE 4.

The first step in the process of producing the desired time interval map after the negatives 20, 25, and 30 have been made is to prepare a mosaic of the first group of negatives 20, 25, so that the area covered by negative 30 can be compared therewith. Next negative 30 is enlarged, or reduced, as required to make its scale the same as that of the mosaic. The resultant corrected scale negative 35 is shown in FIGURE 5. Negative 35 is then superposed on the mosaic in register therewith and the corresponding area of the mosaic marked. A negative 40 corresponding to the marked area is then prepared, as shown in FIGURE 4.

Negatives 35 and 40 are then superimposed in exact registry and alignment holes 41, 42, 43, 44 are punched through one edge of negative 35 and the adjacent parts of the negative 40.

By the foregoing procedure the "after" negative 30 has been correlated with the "before" negatives 20, 25 as to area covered and has been conformed thereto in scale and the resulting "before" negative 35 has been superposed on the "after" negative 40 in exact registry and alignment means 41–44 provided so that the negatives can be brought into registry again whenever desired, e.g. by inserting lithographer pins through the holes.

Figure 6:
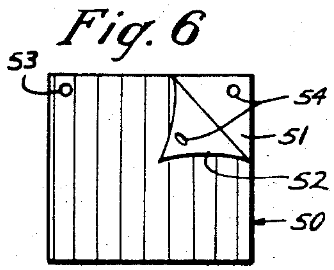
FIGURE 6 is a partible laminated sheet of clear transparent film and a transparent red skin, suitable for preparing a mask, the skin being partially broken away to show the underlying film.

The partible laminate 50 shown in FIGURE 6 may be of the type sold commercially under the trade name "Peelcoat." It includes a clear transparent film 51 and a transparent red skin 52 which can easily be scraped off of the film, e.g. with a knife. Holes 53, 54, registrable with holes 41, 42, 43, 44 are punched in laminate 50.

Figure 7:
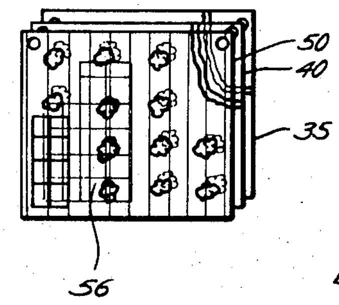
FIGURE 7 is a superposition of the partible laminate and the negatives of FIGURES 4 and 5.
Figure 8:
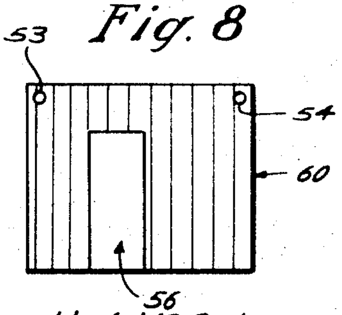
FIGURE 8 is a transparent mask prepared from the partible laminate of FIGURE 6.

The next step in the method is to superimpose the laminate 50 over "before" and "after" negatives 40 and 35, and bring them all into register, as shown in FIGURE 7, e.g. by running lithographer pins through the registry holes 41–44 and 53–54. The superposed sheets are then placed on a light table and inspected to locate the area of change. The red skin is scraped off the laminate 50 in the area of change 56. The laminate 50 with the skin 52 scraped off the area of change 56 provides a mask 60 as shown in FIGURE 8.

Figure 9:
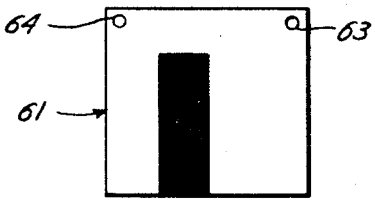
FIGURE 9 is a transparent mask prepared photographically from the FIGURE 8 mask.
Figure 10:
FIGURE 10 is a reverse transparent mask prepared photographically from the FIGURE 9 mask.

The red skin of mask 60, though transparent to white light, provides sufficient contrast with the clear film 51 so that a transparent photographic film may be exposed through it to produce a mask 61 as shown in FIGURE 9. A reverse mask 62, shown in FIGURE 10, is then prepared by exposing a transparent photographic film through direct mask 61. Both direct mask 61 and reverse mask 62 are provided with registry holes whereby their positions relative to each other and preliminary mask 60 are established and maintained, e.g. with pins.

Figure 11:
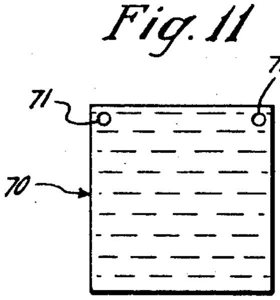
FIGURE 11 is a transparent half-tone screen.
Figures 12, 13:
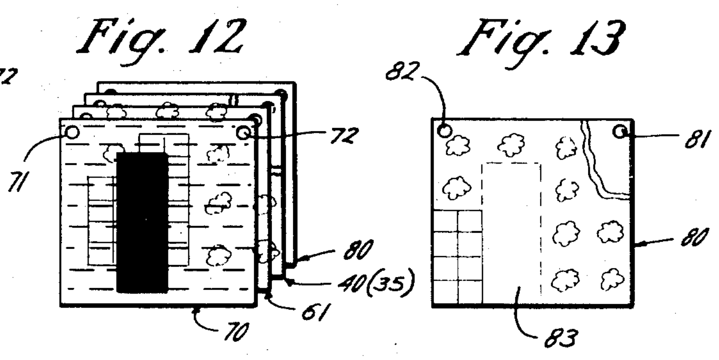
FIGURE 12 is a superposition of the mask of FIGURE 10, one of the negatives of FIGURES 4 and 5, the half-tone screen, and a sheet of positive print paper.
FIGURE 13 shows the positive print paper as first partially printed in half-tone.

The next step in the procedure involves use of half-tone screen 70 shown in FIGURE 11. Screen 70 also has registry holes 71, 72, registrable with holes 63–66 of the masks and with holes 41–43 of before and after negative 40, 35. A sheet of photosensitive paper 80 having registry holes 81, 82 therein is exposed through one of the before and after negatives 40, 35, with the direct mask 61 over the negative and the half-tone screen 70 over the mask, as shown in FIGURE 12. The result is half-tone print of the unchanged area in FIGURE 13.

Figure 14:
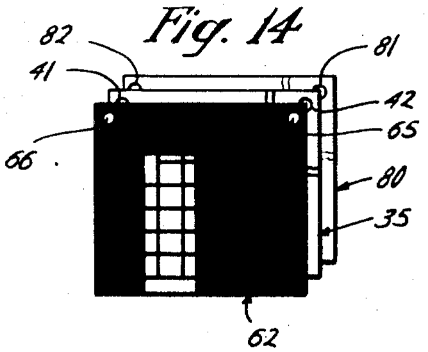
FIGURE 14 shows a superposition of the mask of FIGURE 14, the negative of FIGURE 5, and the partial print of FIGURE 13.
Figure 15:
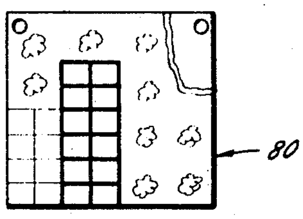
FIGURE 15 shows the final product of the process, a print showing the unchanged area in half-tone and the changed area in full-tone.

The final step, which could be performed before the last described step instead of afterwards, is to expose photosensitive paper 80 through after negative 35 with reverse mask 66 over the negative. This is illustrated in FIGURE 14. The registry holes insure that only the unexposed part 83 of print 80 is left uncovered by mask 35. The result is a full tone print of the changed area juxtaposed to a half-tone print of the unchanged area, as shown in FIGURE 15.

While a preferred embodiment of the invention has been shown and described, other embodiments of the invention can be made by one skilled in the art without departing from the spirit of the invention.

The invention claimed is:

1. Method of making a time contrast photograph in which unchanged places are printed in half-tone and changed places are printed in full tone comprising:

preparing from before and after photographs equal scale before and after negative transparencies of the same locale, superposing the before and after negative transparencies in register with each other, placing a laminate of transparent film and transparent red skin over the superposed negative transparencies, peeling off the skin from the laminate in the places of change as revealed by a comparison of the superposed transparencies to produce a preliminary mask, exposing a transparent light sensitive film through the temporary mask to produce a direct transparent mask, exposing a second light sensitive transparent film through the direct mask to produce a reverse mask, exposing a sheet of photosensitive paper through the reverse mask and after negative transparency, and, also exposing said sheet of photosensitive paper through a half-tone screen, the direct mask, and one of the before and after negative transparencies.

2. Photographic method in which a sheet of photosenstive paper is exposed through a half-tone screen, a first transparent negative and first transparent mask to print one part of the paper in half-tone and is exposed through a second transparent negative and a second transparent mask to print another portion of the paper in full tone, characterized by the steps of making a first photograph of a locale and making a second photograph of the same locale at a subsequent time when the appearance of the locale has changed relative to the appearance when the first photograph was taken, thereby to provide said first and second transparent negatives, superimposing said negatives one upon the other, optically comparing the superposed negatives, and preparing direct and reverse masks corresponding to the places of changed and unchanged appearance as determined by the comparison, thereby to provide said first and second masks, exposing a sheet of photosensitive paper through the second mask and second transparent negative, and also exposing said sheet of photosensitive paper through a half-tone screen, the first mask, and one of said transparent negatives, whereby the resultant print on said sheet of photosensitive paper shows places unchanged in appearance in half-tone and places of changed appearance in full tone.

3. Method according to claim 2 including the further steps of:

when said negatives are superimposed one upon the other, superimposing thereon a laminate of transparent film and a skin of material transparent to white light but at least partially opaque to light of frequencies to which photographic film is sensitive, peeling off the skin over a part of the laminate to divide the laminate into contrasting peeled and unpeeled portions, one portion corrresponding to the places of changed appearance and the other to the places of unchanged appearance, and photographically preparing said masks from said partially peeled laminate.

References Cited

UNITED STATES PATENTS 2,665,984 1/1954 Le Tourneau et al. ---- 96—43

OTHER REFERENCES

Moffit: "Photogrammetry," 1959, International Textbook Co., pp. 130–132.

Denstman: "Shooting Combos," January 1965, in Plant Printer, pp. 32–34, 46.

GEORGE F. LESMES, Primary Examiner

R. E. MARTIN, Assistant Examiner

U.S. Cl. X.R.

96—45